Jan. 25, 1955                G. SMITH                2,700,758
                           MEASURING DEVICE
                      Original Filed Dec. 6, 1949
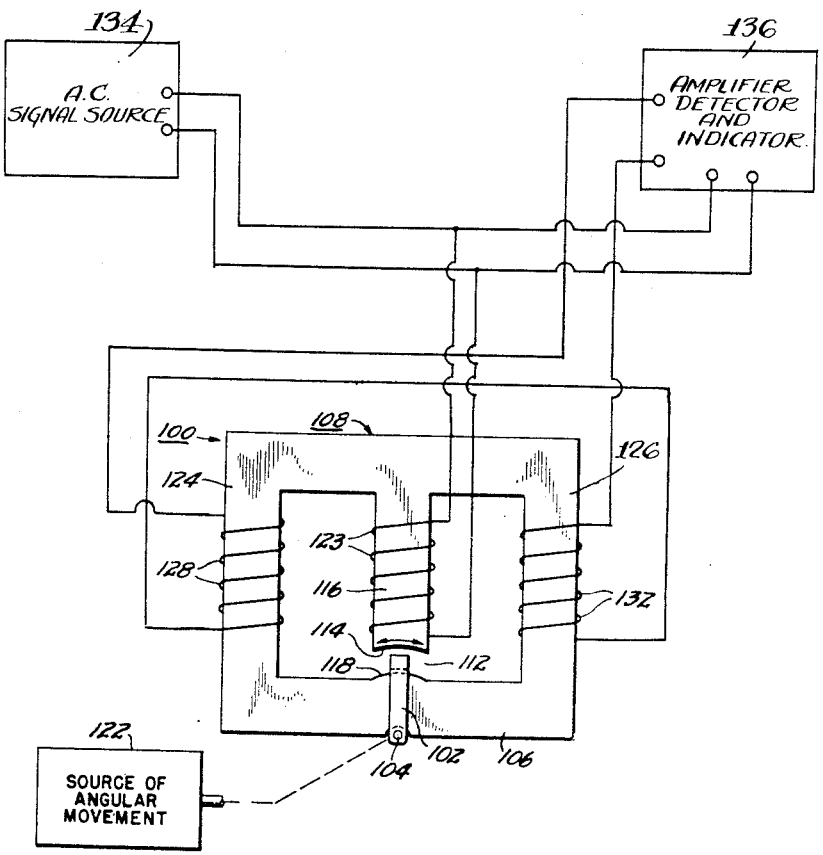
INVENTOR
GRAYDON SMITH
BY
Curtis Morris & Safford
ATTORNEYS

United States Patent Office 2,700,758
Patented Jan. 25, 1955

2,700,758

MEASURING DEVICE

Graydon Smith, Concord, Mass., assignor to Graydon Smith Products Corporation, Boston, Mass.

Original application December 6, 1949, Serial No. 131,410, now Patent No. 2,631,272, dated March 10, 1953. Divided and this application July 19, 1952, Serial No. 299,897

6 Claims. (Cl. 340—199)

This invention is in the field of electrical measuring systems and relates particularly to devices for producing an electrical signal whose value is a measure of the displacement of a movable element from a predetermined position. This is a division of my application Serial No. 131,410, filed December 6, 1949, now U. S. Patent 2,631,272.

In many instances, the value of an unknown condition can be measured by arranging for the condition to control the physical displacement of a movable element and measuring the extent of the displacement.

Because electrical signals can be magnified electronically, it is advantageous in many instances to translate the position or displacement of the movable element into an electrical signal which, after amplification, can be used to operate an indicator, recorder, control system, or the like.

A large variety of such devices for translating physical displacements into electrical signals have been heretofore proposed. However, certain undesirable characteristics inherent in the prior devices have limited their use. For example, some position responsive devices are not sufficiently sensitive to permit precise measurements, some have unstable or non-linear response characteristics which may be of such nature that correction or compensation is difficult or impossible, and many such devices deliver only feeble electrical quantities so that compensation circuits which waste part of the measuring signal in order to compensate for the characteristics of the measuring device or other parts of the system cannot be employed.

It is an object of the present invention to provide a measuring device responsive to angular position and which combines a large number of advantageous features to overcome in a large measure the disadvantages of earlier devices whereby it is well suited for use in many widely different applications. In a preferred embodiment of the invention, a rotatably mounted nonmagnetic element controls the relative distribution of alternating magnetic flux between two alternate magnetic circuit paths.

The flux in the two paths is caused to generate corresponding voltages by which the relative distribution of flux can be measured. Such an arrangement provides high sensitivity, a relatively high output signal, and minimum reaction forces on the positioned element. In one aspect, the invention is directed to improving the sensitivity and precision of devices responsive to angular position. Another aspect of the invention relates to such a position responsive device that is linearly responsive to angular displacement. Still another aspect of the invention is directed to a position sensitive device in which there is substantially no reactive force developed on the movable element by the associated magnetic circuits.

These and other objects, aspects, and advantages of the invention will be in part pointed out in and in part apparent from the following description considered in conjunction with the accompanying drawing which shows a preferred embodiment of the invention for measuring angular displacement.

As shown in the drawing, a position responsive device, generally indicated at 100, is arranged to measure the angular displacement. A ring or "flux-barrier" indicated at 102, which is pivotally mounted as at 104, near the lower portion of a bottom core leg 106 of a ferromagnetic core, generally indicated at 108.

The upper part of the flux-barrier 102 moves along a uniform arcuate gap 112 defined by a concave end 114 of an inner leg 116 of the core 108 and a convex boss 118 formed on the adjacent surface of the core portion 106.

A source 122 of angular rotation, the extent of which is to be measured, is coupled by any suitable means (not shown) so as to cause the flux-barrier 102 to rotate about its pivot 104.

By the term "flux-barrier" is meant a nonmagnetic, electrically conducting member which resists any change in the magnetic flux linking it or passing through it. In this example, the flux-barrier 102 comprises a shorted turn or loop of conductive nonmagnetic material such as copper, brass, or the like, and encloses, and is spaced from, the bottom core leg 106. Angular movement of the flux-barrier element 102 controls the relative division of flux between two outer legs 124 and 126 of the core 108.

In order to accomplish this flux control, the flux-barrier element 102 extends through the air gap 112, which, in this example, is of uniform cross-sectional area, formed by the space between the upper surface of the bottom core leg 106 and the free end 114 of the inner core leg 116. This core leg 116 is connected to an upper core arm to form a T-shaped portion of the core, the outer ends of the cross-bar of the T being joined, respectively, to the outer core legs 124 and 126. Alternating flux is induced in the core 108 by the flow of alternating current through an energizing winding 123 which surrounds the inner core leg 116.

If the flux-barrier 102 is positioned at the horizontal center of the air gap, that is, midway between the right and left hand edges of the air gap 112, as shown in the drawing, the flux produced by the winding 123 will be divided equally between the right and left portions of the bottom core leg 106 with one-half of the flux lines extending through each of the core legs 124 and 126.

If the flux-barrier 18 is displaced angularly in either direction from this center or zero position, the balance of flux in the two legs 124 and 126 will be disturbed. For example, assume that the source 122 rotates the flux-barrier 102 to cause its upper portion to move toward the right as viewed in the drawing, so as to reduce the area of the air gap on the right of the flux-barrier 102 and to increase the area of the air gap on the left of the flux-barrier 102. The flux lines through that portion of the air gap 112 to the left of the flux-barrier 102 will pass into the core leg 106, but will be prevented from extending to the right through the core leg 106 by the presence of the flux-barrier 102, and so will extend through the outer leg 124; and those flux lines extending across the air gap to the right of the flux-barrier 102 will be confined to the other outer leg 126. Thus, the greater proportion of the flux will be in leg 124 and a lesser proportion will be produced in leg 126.

Because the distribution of flux across the air gap 112 is substantially linear, over the useful range of movement of the flux-barrier 102, the relative division of flux between the two legs 124 and 126 of the core 108 is directly proportional to the angular displacement of the flux-barrier 102 from its zero position. It is apparent, however, that for particular applications, where a non-linear response characteristic is desired, the gap may be constructed so that it is non-uniform in a manner to give the desired response characteristic.

In order to measure the relative amounts of flux in the two legs 124 and 126, two identical windings 128 and 132 are positioned, respectively, around the legs 124 and 126. A source of alternating current, indicated in block form at 134, is connected to the energizing winding 123 which surrounds the inner core leg 116. This source delivers an alternating current signal which, for example, may be at the frequency of the alternating current supply mains, and which preferably is stabilized in magnitude to minimize disturbances such as might be caused by changes in the supply voltage. The flow of current through the winding 123 produces alternating magnetic flux which is divided between the outer core legs 124 and 126 in accordance with the displacement of the flux-barrier element 102. The windings 128 and 132 are connected, in series opposition, to the input terminals of suitable measuring circuits such as an amplifier-detector, indicated in block form at 136.

With the flux-barrier element 102 in its zero position, equal voltages are produced in the windings 128 and 132 and effectively cancel each other. When the flux-barrier element 102 is rotated either in a clockwise or counterclockwise direction from its zero position, these voltages are no longer equal and the difference voltage is impressed on the measuring circuits. This unbalance signal is amplified and detected, and the output signal from the measuring circuits may be connected to any desired indicator, recorder, or control system.

Phase sensing may be utilized in the measuring circuits as a means for determining the direction of displacement of the flux-barrier element 102 from its zero position, that is, to determine whether the magnitude of the flux in leg 124 is more or less than the magnitude of the flux in leg 126. Accordingly, the signal source may be connected also to the measuring circuits, so that the phase of the signal applied to input terminals of the measuring circuits can be compared with the phase of the signal from source.

For applications where it is not necessary to determine the direction of displacement of the flux-barrier element 102, the phase detection portion of the system can be eliminated and the amplified signal used to operate an indicator, recorder, or other device. Measuring systems of this general type are well known so that a detailed description is not necessary here.

A relatively high voltage output signal is produced so that compensating networks can be employed readily to correct automatically for temperature deviation and other factors affecting the system. In most applications, it will be found that no compensation networks are required to correct for errors in the position responsive device, which can be constructed to have an inherently linear characteristic and substantially unaffected by ordinary changes in environmental conditions. The null point is sharp and no appreciable third harmonic component is present in the output signal so that a good null is obtained.

The flux-barrier is of non-magnetic material so that there is no magnetic attraction between it and other parts of the measuring device to impede its free movement, and it has been found that there is very little reactive force on the flux-barrier caused by the circulating currents induced therein. This effect is small if a high impedance circuit is connected across the windings 128 and 132. Thus, when these windings are coupled to the grid-cathode input circuit of an amplifier, such a high impedance arrangement is readily available.

The embodiment of the invention described above is well adapted for achieving the ends and objects hereinbefore set forth. It is subject to various modifications both in structure and manner of construction and can be modified readily so as to best suit the needs of each particular use.

What is claimed is:

1. A position-responsive device including a ferromagnetic structure arranged to form first and second magnetic circuits having a common portion and an air-gap forming a series portion of one of said magnetic circuits, means for inducing alternating flux in said common portion, a rotatably-mounted flux-barrier of non-magnetic material positioned to extend into said air-gap, said flux barrier comprising a closed loop of electrically-conductive material, a pivot mounting for said flux barrier adjacent one portion of its periphery to permit arcuate movement of said flux barrier in said air-gap, thereby to vary the relative division of flux between said first and second magnetic circuits as a direct measure of the angular displacement of said flux-barrier from a predetermined position, and a source of angular movement coupled to said flux barrier, whereby the angular position of said source is directly measured by the relative division of said flux.

2. Apparatus as claimed in claim 1 wherein said flux-barrier comprises a ring and said pivot is located on the part of the ring most distant from said air-gap and said air-gap is defined by substantially concentric arcuate surfaces of ferromagnetic material forming part of said magnetic circuits, whereby said air-gap has a uniform cross-sectional area and the distribution of magnetic flux across said air-gap is substantially linear so that the relative division of magnetic flux between said two magnetic circuits is directly proportional to the angular displacement of said ring.

3. A position responsive device including a ferromagnetic structure arranged to form first and second magnetic circuits having a common portion and an air gap forming a series portion of one of said magnetic circuits, a first winding for inducing alternating flux in said common portion, a pivotally-mounted ring of non-magnetic material positioned to extend into said air-gap and pivot around a portion of the ring outside the air-gap thereby to vary the relative division of flux between said first and second magnetic circuits as a measure of the angular displacement of said flux-barrier from a predetermined position, second and third windings connected in series opposition and coupled respectively to said first and second magnetic circuits, and measuring means connected to said second and third windings for indicating the displacement of said flux-barrier from said predetermined position.

4. In a device for measuring angular displacement, first and second ferromagnetic core portions forming first and second magnetic circuits interconnected at a junction, said core portions having a first curved surface, a ferromagnetic structure having an end portion positioned adjacent but spaced from said junction of said first and second circuits, said end portion having a second curved surface uniformly spaced from said first curved surface to form a curved uniform gap between said first and second surfaces, means for generating alternating flux in said structure whereby said flux extends across said gap to said first and second circuits, a rotatably-mounted non-magnetic loop of electrically-conductive material having a part extending into said gap, and a pivot secured to a portion of the loop remote from said gap and arranged to swing said loop part along an arcuate path in said gap to vary the coupling of flux between said generating means and said first and second circuits, whereby the division of flux in said circuits is a direct measure of the angular displacement of said loop from a predetermined position.

5. A device for measuring angular displacement, comprising first and second ferromagnetic core portions forming first and second magnetic circuits interconnected at a junction, said core portions having a convex boss thereon at said junction, a ferromagnetic structure having an end portion positioned adjacent but spaced from said convex boss, said end portion having a concave curved surface substantially concentric with the curved surface of said boss to form a curved gap between said boss and said concave surface, means for generating alternating flux in said structure whereby said flux extends across said gap to said boss and to said first and second circuits, a rotatably-mounted non-magnetic loop of electrically-conductive material having a part extending into said gap, a pivot secured to a portion of the loop remote from said gap, and a source of angular movement coupled to said pivot, and arranged to swing said loop part along an arcuate path in said gap concentric with said concave surface to vary the coupling of flux between said generating means and said first and second circuits, whereby the division of flux in said circuits is a direct measure of the angular displacement of said loop from a predetermined position.

6. A device as claimed in claim 5 wherein said first and second core portions have a pivot recess formed therein at their junction on the opposite side from said boss, said pivot passing through said recess, the surface of said recess being concentric with said pivot and with the surface of said boss.

References Cited in the file of this patent

UNITED STATES PATENTS

| 1,735,141 | Sturner | Nov. 12, 1929 |
| 2,207,248 | Garlick, Jr. | July 9, 1940 |
| 2,379,417 | Conrad | July 3, 1945 |